*L. B. Pitcher,*

*Mortar Mixer.*

N°. 105,840.   Patented July 26, 1870.

Witnesses:
N B Smith
C. W. Smith

Inventor:
Lyman B. Pitcher

United States Patent Office.

LEMAN B. PITCHER, OF SALINA, NEW YORK.

*Letters Patent No. 105,840, dated July 26, 1870.*

IMPROVEMENT IN MORTAR-MILLS.

The Schedule referred to in these Letters Patent and making part of the same.

*To all whom it may concern:*

Be it known that I, LEMAN B. PITCHER, of the town of Salina, in the county of Onondaga and State of New York, have invented a new and useful Improvement relating to a "Working and Sifting-Cylinder;" and I do hereby declare that the following is a full, clear, and exact description of the same, reference being had to the annexed drawings making a part of this specification, wherein—

Figure 1:
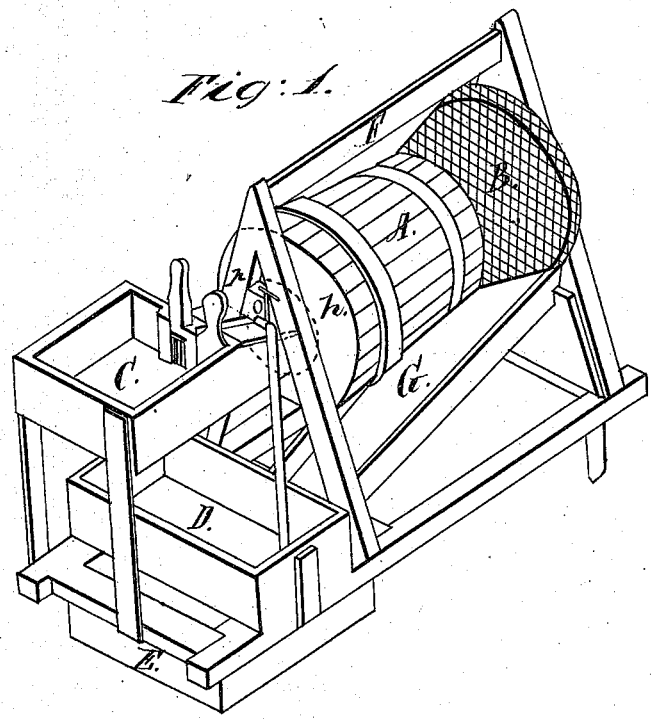
Figure 2:
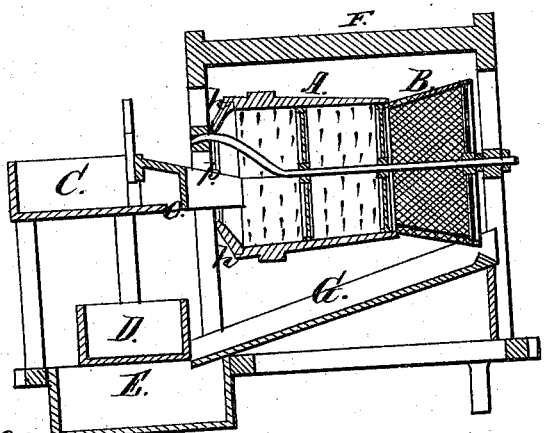

Figure 1 represents a perspective view, and
Figure 2 a sectional view thereof.

The letters used represent corresponding parts whenever used.

To enable others skilled in the art to make and use my invention, I will proceed to describe the same and its application to use.

In Letters Patent of the United States granted to me, 27th day of November, 1866, and numbered 60,055, a circular or hooped-shaped sieve is described, to sift lime-paste.

The means therein set forth for sifting lime-paste is defective, because the sieve therein described was hoop-shaped, and, being made on a line with the cylinder, the bottom of the sieve is always on a level, and therefore has no power in and of itself to discharge the lime-dregs. Therefore the dregs had to be taken away by some assisting means, and for that purpose a spout was used.

The improvement which I have made consists in making the revolving sieve B in a flaring or spreading form, so that the bottom of sieve B will always slope downward and outward; by which form and means, the dregs, as they accrue on the revolving flaring sieve B, and are carried partly up by the sieve, will roll or slide downwardly and outwardly, and, in and of themselves, by the motion and shape of the sieve B, work out and be discharged without other assistance. In this way, the sieve B is kept comparatively clean where the paste flows onto it.

The "working and sifting cylinder" A and B, is a compound machine. The cylinder A, externally, is in the form of a truncated cone, or it may be made with parallel sides, made of wood and iron or other materials, formed with staves and hoops, or otherwise mounted on spider arms and rims, made in usual form. The length of the cylinder A is two feet, more or less. The diameter of the larger end is two feet and six inches, more or less, and of the smaller end, two feet, more or less, provided with a head-piece, generally, in the larger end; yet for some purposes it is best to be in the smaller end, with a hole in the center of said head-piece, fifteen inches in diameter, more or less. The cylinder A is armed or provided with three hundred spikes, more or less, of the size and length of twelve-penny fence-nails, larger or smaller, standing inwardly. The arming or providing may be varied or omitted.

The flaring revolving sieve B is two feet long, more or less, and two feet six inches in diameter at the larger and outer end, more or less, and two feet at the smaller end, more or less, formed of wire-cloth or perforated metal, supported at the outer end or spider arms and rims. The meshes or holes in the sieve B are one hundred to the square inch for sifting lime-paste, more or less. The meshes may be larger or smaller, and of any shape, according to the work to be performed. The small end of sieve B is attached by bolts and screws to the open end of the cylinder A, or otherwise, as may be required, forming the "working and sifting cylinder" A and B. The whole is mounted and revolved on a non-revolving bent shaft, substantially in the manner and for the reasons set forth in Letters Patent of the United States, numbered 80,212, or it may be mounted and revolved as set forth in Letters Patent of the United States, numbered 70,742 or 60,055. Being a flaring and revolving sieve, a finer mesh can successfully be used in sifting paste or dry substances than otherwise can be used.

The working and sifting cylinder A and B, as now improved, can be successfully used for many other purposes than the sifting of lime or other pastes, to wit: it may be used for sifting or assorting sands, gravel, grain, salt, and coal, or similar articles; or for washing or scouring sand and gravel for mortars, cements, sidewalks or roofing, or for any purpose where it is desirable to wash or clean materials, and afterward separate or not the fine from the coarse with or without water; or for drying or cooling grain or other similar articles, with or without artificial heat or currents of air; or for reducing, working, and sifting clay, for brick, tile, and pottery work. The clay, being softened with water, is put in cylinder A, where the teeth or spikes will reduce the mass to a fluid paste, more water being added when required, and as it passes onto and through the sieve the stone or dregs are taken out, leaving a fine clay-paste, easily converted into a putty or dough, for the purposes named, or for like purposes.

What I claim as my invention, and desire to secure by Letters Patent of the United States, is—

The sieve attachment B, made in a flaring or spreading form, as an improvement on the hooped-shaped form, described in Letters Patent of the United States dated 27th November, 1866, and numbered 60,055, in combination with the cylinder A, substantially in the manner and for the purpose above described.

LEMAN B. PITCHER.

Witnesses:
D. C. MARKHAM,
C. W. SMITH.